(12) United States Patent
Jay (10) Patent No.: US 6,834,755 B2
(45) Date of Patent: Dec. 28, 2004

(54) CONVEYING MACHINES (76) Inventor: Chauhan Vi Jay, "Kanila", 353, S.V.Road, Vile Parle (West) Mumbai 400056 (IN)

(*) Notice: Subject to any disclaimer, the term of this patent is extended or adjusted under 35 U.S.C. 154(b) by 0 days.

(21) Appl. No.: 10/796,884

(22) Filed: Mar. 9, 2004

(65) Prior Publication Data
US 2004/0173959 A1 Sep. 9, 2004

Related U.S. Application Data (63) Continuation of application No. 10/308,152, filed on Dec. 2, 2002, now abandoned.

(30) Foreign Application Priority Data

Dec. 4, 2001 (IN) .................................. 1153/MUM/2001

(51) Int. Cl.$^7$ ............................................. B65G 47/30
(52) U.S. Cl. .................... 198/418.6; 198/429; 198/617; 414/798.9
(58) Field of Search ............................ 198/418.6, 429, 198/617; 414/798.9, 790.6

(56) References Cited

U.S. PATENT DOCUMENTS

| | | | | |
|---|---|---|---|---|
| 3,894,631 A | * | 7/1975 | Rose et al. ................. | 198/378 |
| 4,141,193 A | * | 2/1979 | Joa ............................. | 53/529 |
| 4,217,979 A | * | 8/1980 | Bald et al. ................ | 198/418.3 |
| 4,265,354 A | * | 5/1981 | Sinnema ..................... | 198/374 |
| 4,768,642 A | * | 9/1988 | Hunter ...................... | 198/419.2 |
| 5,454,687 A | * | 10/1995 | Johnson et al. .......... | 414/790.7 |
| 5,460,258 A | * | 10/1995 | Tisma ........................ | 198/430 |
| 5,482,428 A | * | 1/1996 | Kuhlman ................. | 414/798.1 |
| 5,579,894 A | * | 12/1996 | Glazier et al. ............. | 198/431 |
| 5,897,291 A | * | 4/1999 | Gerwe et al. ............ | 414/790.7 |
| 6,053,695 A | * | 4/2000 | Longoria et al. ........ | 414/790.8 |
| 6,360,872 B1 | * | 3/2002 | Guidetti ................... | 198/419.1 |
| 6,374,984 B1 | * | 4/2002 | Nagler ....................... | 198/385 |

* cited by examiner

Primary Examiner—Douglas Hess
(74) Attorney, Agent, or Firm—Muserlian, Lucas and Mercanti (57) ABSTRACT An apparatus and method for forming batches in predetermined count or length of laminar articles standing on edge for transfer from multiple supply lines/chutes to a common delivery line is disclosed. The common delivery line is located operatively below the supply lines/chutes. The axis of movement of the common delivery line is perpendicular to the axes of movement of the supply lines/chutes. The apparatus includes a horizontal platform on which the laminar articles, such as biscuits are led from the supply lines/chutes, pusher bars operating simultaneously for each of the arrays of laminar articles emanating from the supply lines/chutes on to the platform. The batch of articles displaced from the arrays are pushed towards striker plates adjacent to hatches in the platform. The batch of laminar articles strike the striker plate, align themselves and rebound from the striker plate without deformation and drop through the hatches in the platform to pockets in the common delivery line below.

12 Claims, 8 Drawing Sheets

CONVEYING MACHINES

This application is a continuation of U.S. patent application Ser. No. 10/308,152 filed Dec. 2, 2002, now abandoned.

The present invention is concerned with apparatus for handling laminar articles in batches or arrays, especially articles which are standing on edge and leaning against one another, for example biscuits, delivered by one or a plurality of supply lines/chutes.

The apparatus is designed to separate the laminar articles arriving progressively from the supply lines into respective batches and to supply these batches to a receiving line, which transfers them to subsequent processing stages such as wrapping and boxing.

The present invention particularly also relates to devices for transferring biscuits, and confectionery products in general, from a first continuous belt supply conveyor/chute to a second transverse receiving line belt conveyor for further processing.

The present invention further relates to an apparatus and method for forming and transferring batches or arrays of laminar articles for subsequent packaging.

In the industrial manufacture and packaging of biscuits, the biscuits leave the cooking oven in a continuous flow, along a one or a plurality of supply lines/chutes. For some types of biscuit and packaging, traveling along the supply line, the biscuits are stood on edge and abutted against one another. It is then necessary to create from the delivery lines appropriate batches, batches or arrays either consisting of a predetermined number of biscuits or having, in total, a predetermined length and delivering these batches to a wrapping or boxing mechanism.

Apparatus, which is already available for the formation for such batches and their transfer to the receiving lines, are subject to considerable difficulties and inconveniences.

In fact the solutions which have been resorted to in such known apparatus in order to vary the number of supply lines, provide for temporary shutdowns or malfunctions of some of the lines, cope with variations in the thickness of biscuits in the course of production, or variation of capacity on the supply lines, have been very complex and unwieldy.

Typically one supply line or chute is able to feed only one receiving line for wrapping or boxing. In automatic packing machines, there is a speed mismatch, in that, the supply lines or chutes are unable to cope with the speed of the receiving line for wrapping or boxing. This leads to retardation in the speed at the wrapping or boxing end, and hence loss in efficiency of the energy-source and speed of packing.

Furthermore existing equipment, because of its construction and so as not to cause breakage of fragile articles such as biscuits, operates at low speed or takes up too much space.

In accordance with the prior art, biscuits are arranged in a mutual head-to-tail alignment on a continuous belt by, for example, controlling the speed of another continuous belt which is located upstream of the first and is supplied with biscuits from a production unit, the biscuits leaving the latter cooked, covered in chocolate, or otherwise prepared.

An object of the present invention is therefore to provide improved an apparatus for transferring laminar articles delivered standing on from supply lines batches to a receiving line for further processing.

Particularly, this invention relates in general to apparatus for handling for packaging biscuits, or other laminar objects by the use of a moving conveyor, which accepts biscuits, and transfers the biscuits to a second supply line.

It is usual when automatically feeding batches of biscuits to an intermittently operating in feed conveyor of a wrapping machine to deposit simultaneously a series of batches spaced apart at the same pitch as the pusher bars of the in feed conveyor.

A problem, however, arises if it is sought to utilize this procedure with a continuously moving in feed conveyor because, to enable time for depositing and clearance of the depositing means above the batches after depositing into the continuously moving in feed conveyor, particularly if a plurality of chutes or in feed supply lines or conveyors are used.

The chutes from which the batches or batches are metered need to be spaced apart at predetermined uniform pitch. Because of a large amount of intervening hardware of the supply lines and the delivering chute and the pusher bar mechanism, it has not been possible to transfer the individual batches on to a single receiving line, preferably transverse and common to the chutes of the supply lines/chutes for onward transmission to a wrapping, boxing or otherwise packaging workstation because in the prior art this leads to a very wide and cumbersome biscuit feeding machine. Furthermore, the width of such a machine makes it difficult for an operator to supervise the machine.

It is an object of the invention to overcome these difficulties by pitching a plurality of chutes close together and providing pusher bars with pitches corresponding to the width of the chutes and with synchronous movement so that batches of articles are deposited simultaneously from the supply lines/chute on to a receiving line at time-sequenced intervals to coincide with the arrival of pockets in the receiving line.

According to this invention there is provided apparatus for transferring batches in predetermined count or length of laminar articles standing on edge, from at least two supply lines/chutes synchronously to a delivery line of a handling station such as a packing station, said apparatus consisting of

[i] an operatively horizontal platform on which the laminar articles are displaced from the at least two supply lines/chutes;

[ii] a bank of pusher bars one for each supply line/chute positioned on the said platform for pushing a predetermined length of a plurality of said laminar articles in the form of a batch on the said platform;

[iii] displacement means for reciprocating the pusher bars synchronously on the said platform;

[iv] a striker plate, one for each supply/line chute extending operatively, vertically from the said platform;

[v] a hatch positioned adjacent to the each of said striker plates, the size and dimension of the said hatch being larger than the size of the batch of laminar articles;

[vi] a delivery line, having a plurality of pocket formations positioned operatively below the said hatch and adapted to receive in the said pockets, said batches of laminar articles falling through the said hatch for transfer to the handling station, the axis of the movement of the batches of laminar articles on the said delivery line being substantially perpendicular to the axes of movement of the laminar articles in the supply lines/chutes.

The apparatus of this invention also provides for devices for separating articles leaning against each other standing on edge supplied by a plurality of supply lines into a plurality of batches or batches and;transferring them to a receiving line placed transverse to and/or across and spanning all the supply chutes but at a level lower than the discharge end of the supply chutes by dropping the arrays or batches at predetermined pitch intervals on the receiving line in a manner herein described characterized in that in the changing of the level, typically by dropping of the arrays or batches or batches of these articles, typically biscuits the batches, arrays or batches are not significantly disturbed and the intermittent integrity of the batches, batches or arrays of the articles are maintained during the entire course of operation of separating the articles in batches, batches or arrays from the continuous stream of biscuits from the chute in the plurality of supply lines.

Pusher bars are provided preferably moving synchronously and in tandem and in a novel manner in accordance with a preferred embodiment of the process and apparatus of this invention, which is described hereinafter particularly with reference to the accompanying drawings.

The apparatus in accordance with a preferred operative configuration and embodiment includes a plurality of pusher bars disposed at the outlets of the supply lines or chutes and so constructed and arranged as to move in a predetermined manner simultaneously in the operation of the apparatus to separate the incoming stream of articles into batches, arrays or batches and to push the above mentioned batches, arrays or batches of articles in a predetermined manner towards a hatch provided in a platform adjacent to the supply line/chute, each of said hatch presented with a operatively vertically disposed striker plate, and a transverse moving receiving line positioned below each of said hatches to receive the batches, arrays or batches of articles falling by gravity on to the receiving line through the said hatches a plurality of support elements disposed as a continuation of the supply lines at a lower level than said outlets and so constructed simultaneously receive the batches of articles.

The pusher bars move simultaneously alternately between a slow array separating speed to an accelerated pushing speed and positioned, immediately beneath the associated support elements above said supply line chute, and pushing an array, batch or batch of articles, typically biscuits to a lowered position beneath the supply line to a receiving line and arranged, in the lowered position, to receive the batches of articles released through a hatch in a side supported tray adjacent to the chute of the supply line after abutting a striker plate presented proud of the hatch and falling by gravity in a relatively undisturbed arrayed configuration from the hatch onto the receiving line having support elements so as to be released by them in their turn into the receiving line which intersects the direction of traverse of the supply line chutes but at an operatively lower level, the receiving line being arranged to be in continuous motion at controlled speed during the movement of said pusher bars and, between the release onto the receiving line of one set of batches of articles and the release of a subsequent set, being arranged to advance by as many steps as there are supply lines, in a direction transverse to the supply lines.

The invention provides apparatus for feeding batches of laminar articles, such as biscuits from a plurality of chutes spaced equally from one another alongside a continuously moving in feed conveyor leading to a wrapping machine and including a series of pusher bars spaced at a different pitch from the chutes and each serving to advance to the wrapping machine at least one batch of laminar articles, such as biscuits, the apparatus including a receiving line having compartmentalized biscuit carriers movable from a receiving position in which it receives batches of biscuits from all of the chutes to a discharge position in which it transfer biscuits to a wrapping or boxing machine holds the batches below the conveyor with the batches aligned transversely to the conveyor, means for charging the receiving line simultaneously with batches from all the chutes, means for effecting simultaneous dropping of the batches from the supply line to the receiving line, and means for thereafter moving the receiving line to the receiving position for recharging it with further batches and means for displacing a plurality of pusher bars in reciprocatory motion and means for returning the pusher bars between an array separating position to a discharge position to enable the further batches to be dropped for advance by the pusher bars following those which advanced the previous batch of batches.

In a preferred embodiment of the invention control means are provided for control of the simultaneous dropping of the biscuits operated by the pusher bars to release batches of biscuits in the carrier of the receiving line.

Certain embodiments of the invention will now be described in greater detail with reference to the accompanying drawings.

DETAILED DESCRIPTION OF THE PREFERRED EMBODIMENTS

For the purpose of the description with reference to this example laminar articles are referred to as biscuits.

Figure 1:
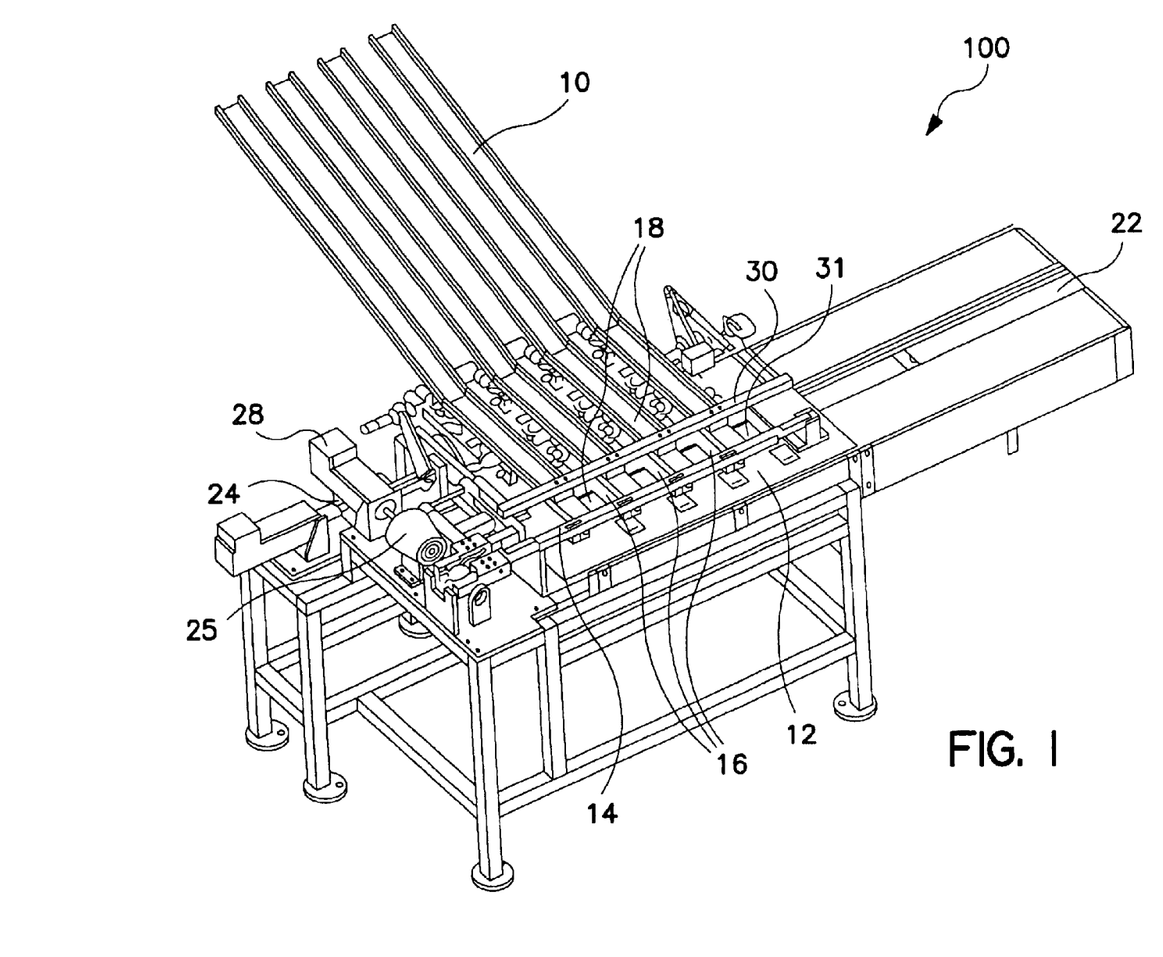
FIG. 1 shows a detailed view of the apparatus in accordance with this invention.

Referring to FIG. 1, the apparatus generally indicated by the reference numeral 100 consists of supply lines/chutes 10 [four chutes are shown in FIG. 1] which direct an array of biscuits [not shown in FIG. 1] to a transfer mechanism in which a batch of biscuits of desired length or quantity are first drawn from the array by the movement of a biscuit take up bar 31 are pushed from the array by means of a pusher bar 14 on to a transfer platform 12 towards striker plates 16. The biscuits strike the striker plates rebound and fall down hatches 18 located adjacent to the striker plates 14 onto pockets [not clearly seen in FIG. 1 but seen in FIGS. 2 to 8] in a receiving line 22 and are conveyed to a further processing station [not shown]. The reciprocating movement of a common connecting rod 30 attached to the pusher bars 14 is controlled, typically by a servo motor 28 and gear arrangements 24 and 25 as shown in the figures or by a cam driven unit. As shown in the figures, biscuits to be batched and transferred are supplied by a series of chutes 10 (in the present example four chutes), each of which supports a horizontal column of superposed biscuits 11 [seen in FIGS. 2 to 8] and from the end of which successive batches 13 of biscuits of a predetermined length are removed.

One such chute 10c only is shown without biscuits for general understanding, but it is to be understood that the chutes are disposed side by side alongside each other.

Figure 2:
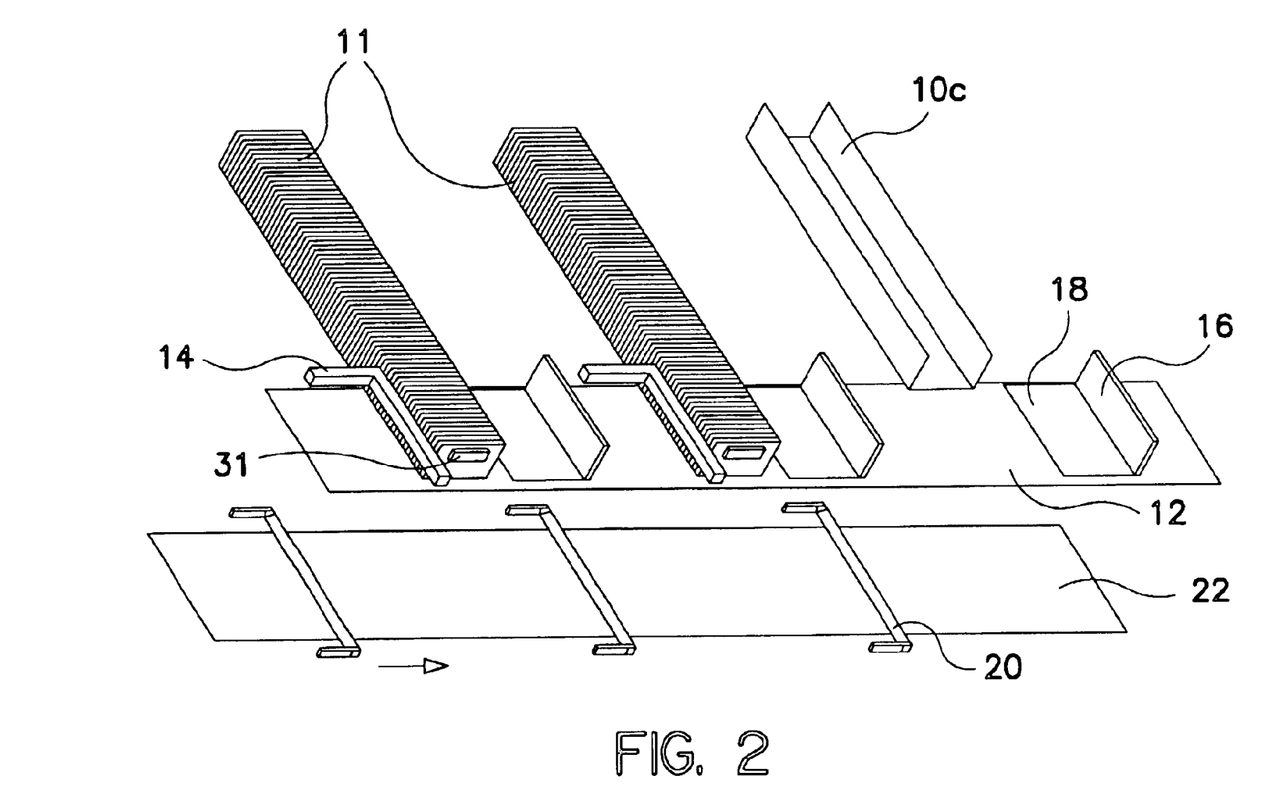
FIGS. 2 to 8 show a diagrammatic elevation showing the sequence of the general arrangement of transfer mechanism of the apparatus according to the invention at different steps in the operation process.
Figure 3:
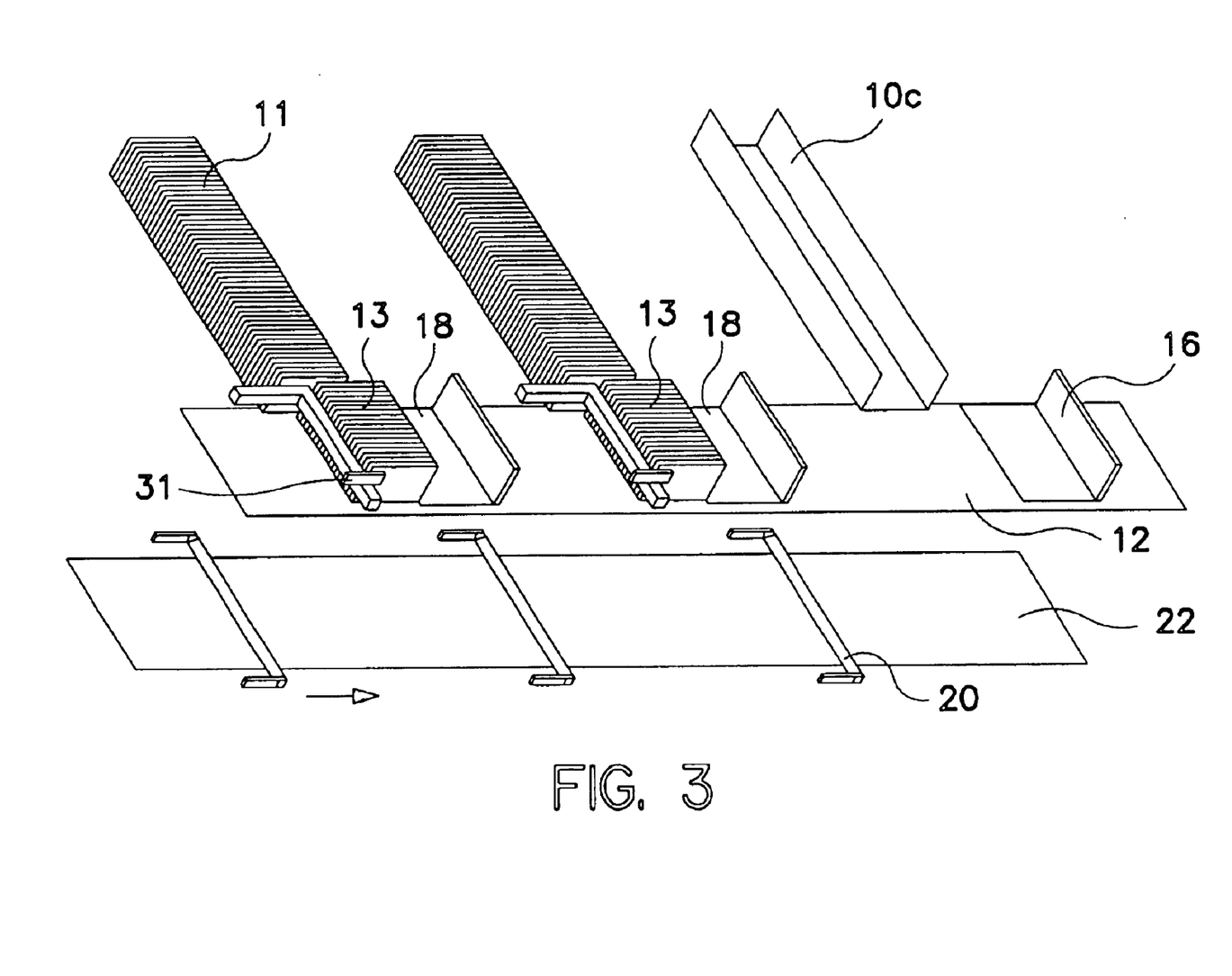
Figure 4:
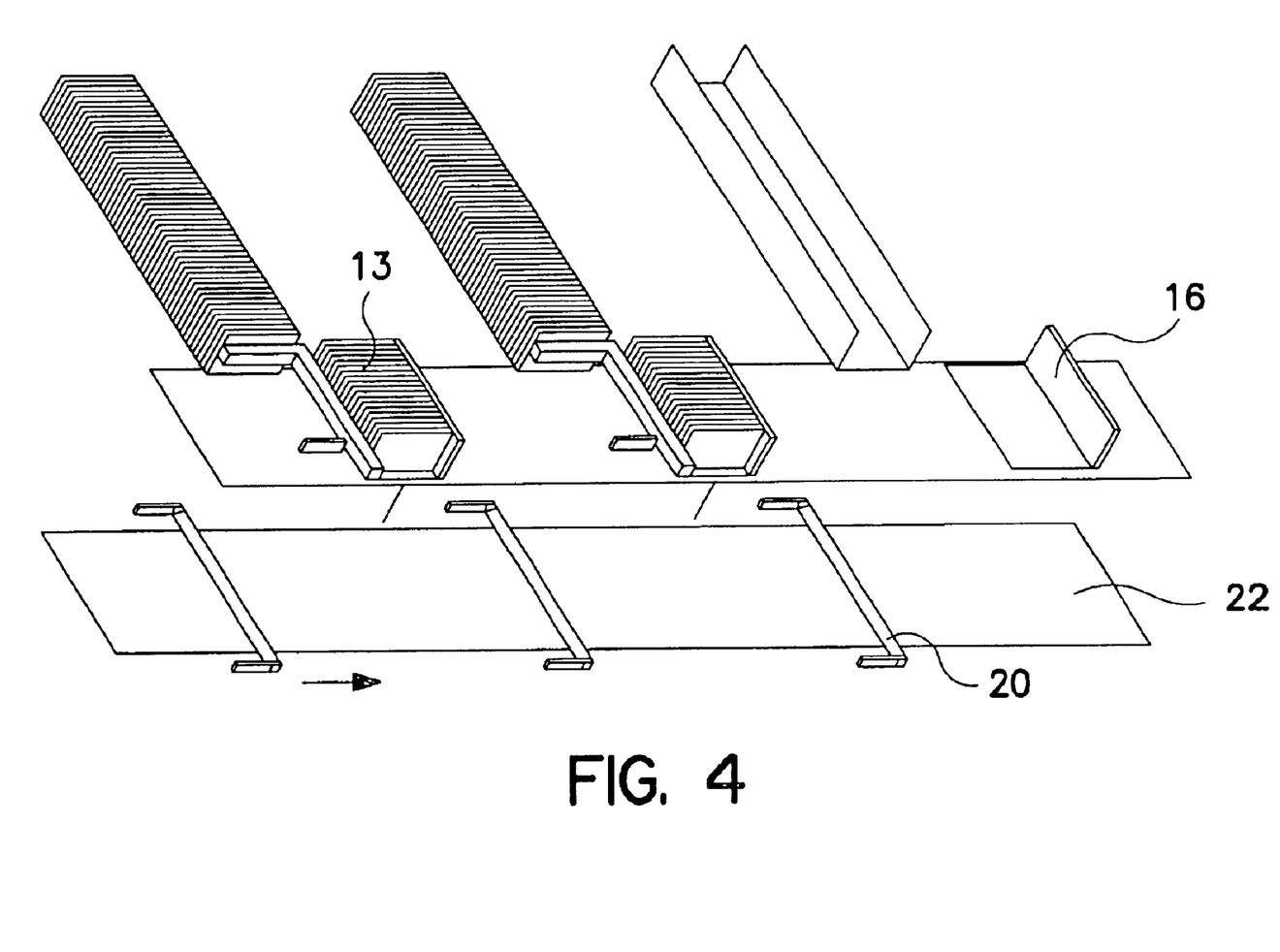
Figure 5:
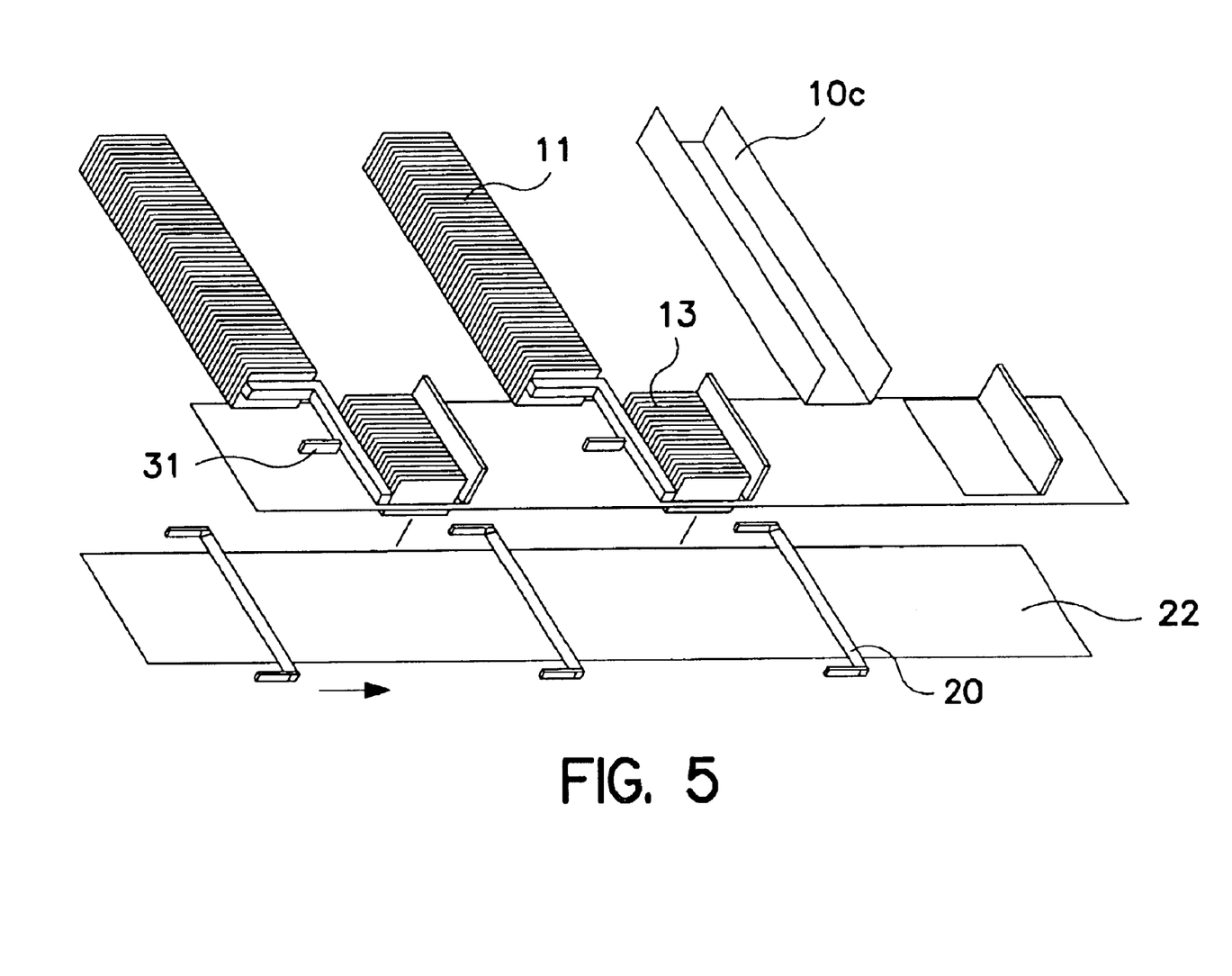

A continuously operating receiving line conveyor 22 leading to a processing station such as wrapping machine (not shown) is disposed at a position lower than the supply line chutes 10. Equispaced synchronously moving pusher bars 14, connected to a common reciprocating connecting rod 31, are positioned adjacent each chute 10 and are caused to reciprocate at intervals by an amount in relation to the width of the batch 13. The pusher bars 14 moves laterally at a controlled rate as the biscuits 11 are drawn from the upper end of the chute 10 and upon completion of separation of a batch as seen in FIG. 2 the forward movement of the pusher bar 14 is accelerated to slide the batch 13 across the surface of a support platform 12 mounted on a frame common to all the chutes. The pusher bars 14 move the batches along the platform 12 until the batches engage striker plates 16 presented upright at one end in the platform 12 as particularly seen in FIG. 3. In this position and as a result of accelerated traverse of the batch 13 on the platform 12, the batch of biscuits 13 strike the striker plate 16 and rebound there from aligning themselves and in this configuration the batches fall down hatches 18 in the platform 12 adjacent each of the striker plate 16. FIGS. 4 and 5 essentially show the batch 13 dropping through the hatches 18 essentially by gravity onto the receiving line 22 with the array in the batch 13 lying relatively undisturbed.

Figure 6:
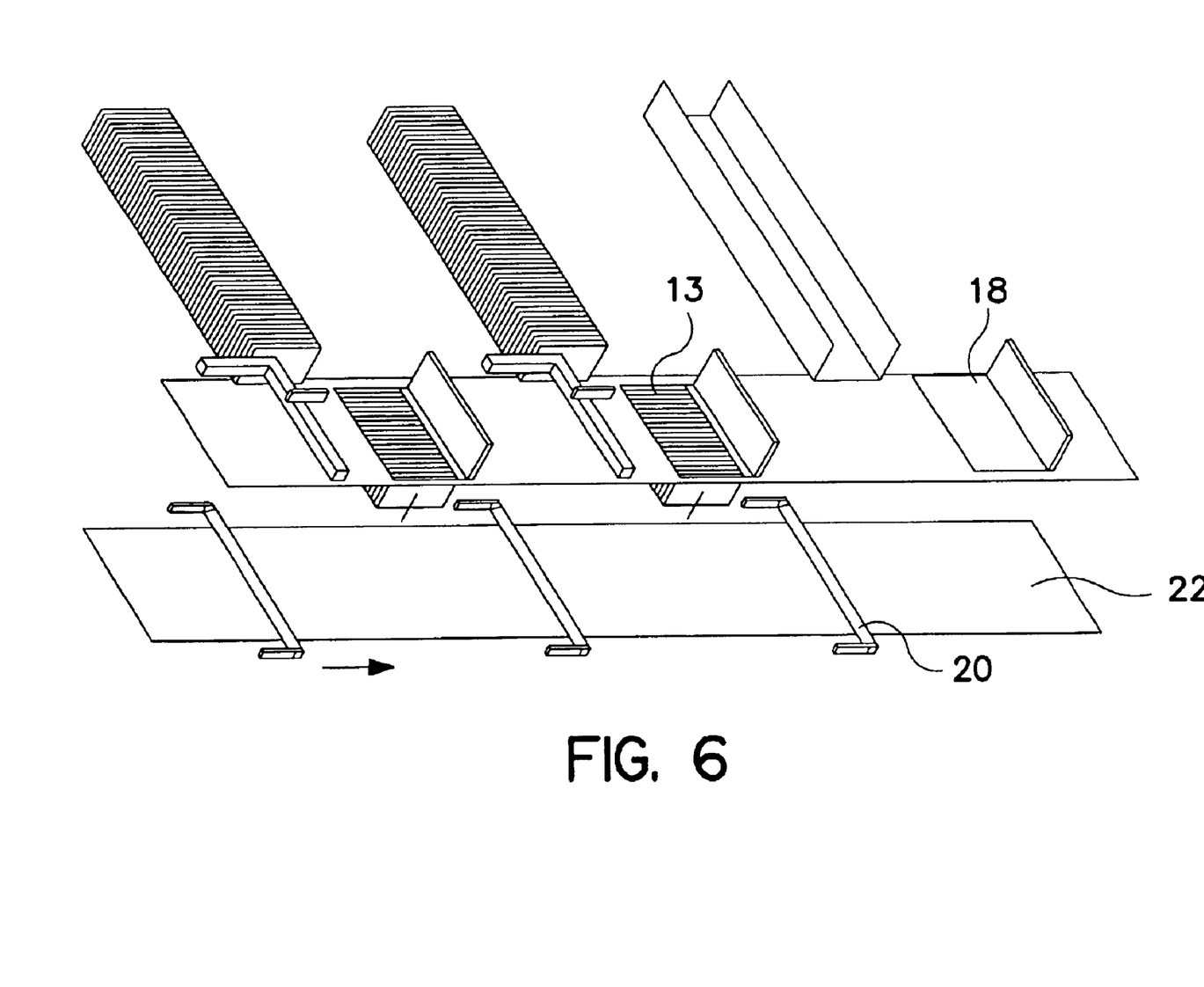
Figure 7:
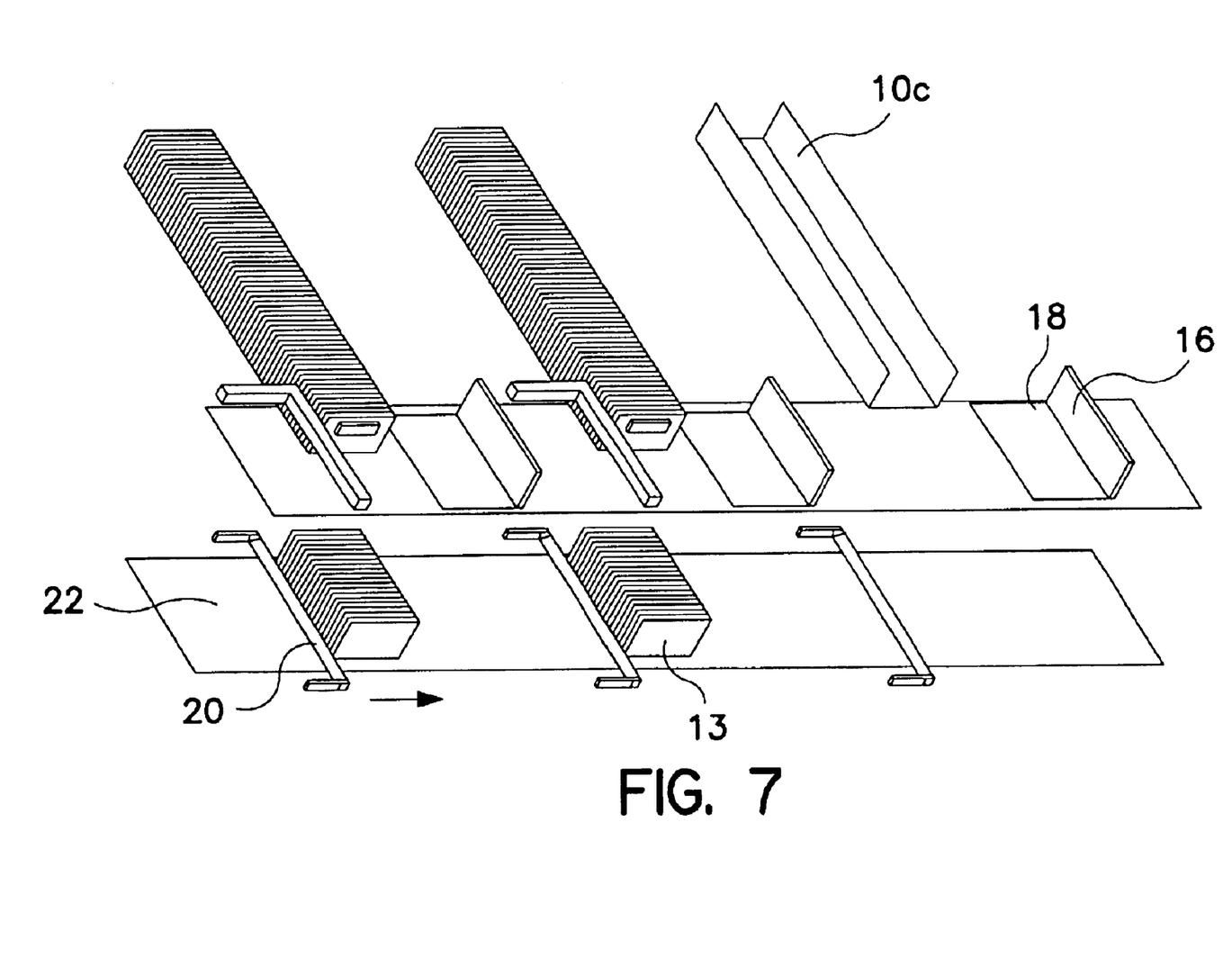
Figure 8:
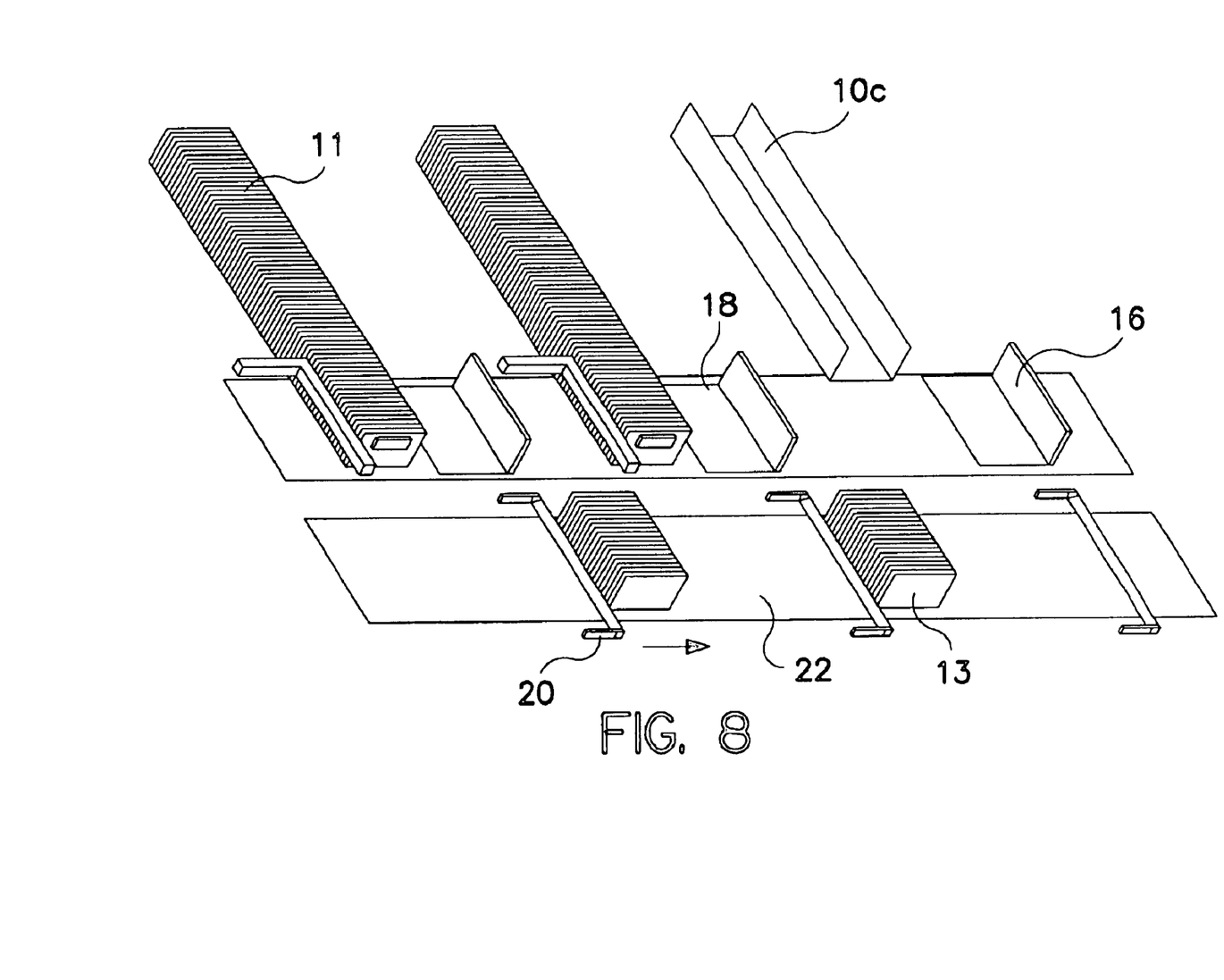

The biscuit batches 13 drop on the receiving line 22 in defined compartments formed by moving driving elements 20 which are formed or extend on the receiving line 22 as seen in FIGS. 6 and 7. As typically seen in FIG. 7 the receiving line advances so that the hatches in the platform are presented with down stream empty compartments in the receiving line for receiving further droppings of batches from the supply lines.

It will be easily understood by one skilled in the art that the apparatus will include timing mechanisms that synchronize and coordinate the movement of the biscuits in the supply line with the movement of the pusher bars and the movement of the transverse receiving line.

It will also be appreciated that the control means may be cam driven, mechanical or otherwise other control devices, e.g. electrical, hydraulic or pneumatic responsive to approach of the pusher bars may be utilized to control the release of the batches.

While the present invention has been described herein with reference to a specific embodiment thereof, it is contemplated that the present invention is not limited thereby and various changes and modifications may be made therein for those skilled in the art without departing from the scope of the invention.

What is claimed is:

1. Apparatus for transferring batches in predetermined count or length of laminar articles standing on edge, from at least two supply lines/chutes synchronously to a delivery line of another handling station such as a packing station, said apparatus consisting of
    [i] an operatively horizontal platform on which the laminar articles are displaced from the at least two supply lines/chutes;
    [ii] a bank of pusher bars, one for each supply line/chute positioned on the said platform for pushing a predetermined length of a plurality of said laminar articles in the form of a batch on the said platform;
    [iii] displacement means for reciprocating the pusher bars synchronously on the said platform;
    [iv] a striker plate, one for each supply/line chute extending operatively, vertically from the said platform;
    [v] a hatch positioned adjacent to the each of said striker plates, the size and dimension of the said hatch being larger than the size of the batch of laminar articles;
    [vi] a delivery line, having a plurality of pocket formations positioned operatively below the said hatch in the said platform and adapted to receive in the said pockets, said batches of laminar articles following through the said hatch for transfer to the other handling station, the axis of the movement of the said delivery line being substantially perpendicular to the axes of movement of the laminar articles in the supply lines/chutes.

2. Apparatus for forming batches in predetermined count or length of laminar articles as claimed in claim 1 in which the apparatus includes a plurality of supply lines/chutes and the said platform being adapted to receive laminar articles from the said supply lines/chutes; there being provided pusher bars, striker plates and hatches one for each supply lines/chutes; each of the pusher bars operating simultaneously for all supply lines/chutes; a common displacement means for all the pusher bars and a common delivery line positioned below the hatches in the said platform.

3. Apparatus for forming batches in predetermined count or length of laminar articles as claimed in claim 1 in which the pusher bars are moving at a speed of 700 to 900 mm per second, sufficient to permit the batch of laminar articles to strike the striker plate, aligning themselves, rebound from the striker plate without deformation and fall through the said hatch.

4. Apparatus for forming batches in predetermined count or length of laminar articles as claimed in claim 3 in which the pusher bar displacement means is a servomotor with suitable controls.

5. Apparatus for forming batches in predetermined count or length of laminar articles as claimed in claim 1 in which the pusher bar displacement means is a servomotor with suitable controls.

6. Apparatus for forming batches in predetermined count or length of laminar articles as claimed in claim 1 in which the pusher bar displacement means is cam and lever control.

7. Apparatus for forming batches in predetermined count or length of laminar articles as claimed in claim 1 in which the pusher bar displacement means is pneumatically or hydraulically operated.

8. Apparatus for forming batches in predetermined count or length of laminar articles as claimed in claim 1 in which the pusher bar displacement means is screw driven.

9. Apparatus for forming batches in predetermined count or length of laminar articles as claimed in claim 1 in which the moving delivery line is a belt conveyer moving substantially horizontally below the said hatch or hatches in the said platform and the pockets are formed in the belt conveyer by means of an open meshed chain having a predetermined pitch.

10. Apparatus for forming batches in predetermined count or length of laminar articles as claimed in claim 1 in which pusher bars and the platform are made of stainless steel.

11. Apparatus forming batched in predetermined count or length of laminar articles as claimed in claim 1 in which the movement of the laminar articles in the supply lines/chutes, the reciprocatory movement of the pusher bars and the movement of the delivery line are synchronized.

12. A method of forming batches of laminar articles standing on edge provided from a plurality of supply lines/chutes to be delivered to the delivery line of a work station in which the batches are further processed typically for packing or wrapping consisting of the following steps:
    (i) providing a platform to which arrays of the laminary articles from the supply lines are led from the said plurality of supply lines/chutes;
    (ii) providing hatches on the platforms, one for each of the supply lines/chutes;
    (iii) providing a striker plate positioned operatively vertically on the said platform adjacent to the said hatches;
    (iv) providing a common delivery line below the said platform, the axis of movement of the said common delivery line being substantially perpendicular to the axes of movement of the laminar articles through the supply lines/chutes;

(v) displacing batches of laminar articles by means of commonly reciprocating pusher bars, such that the batches of laminar articles strike against the striker plate adjacent to the respective hatches are aligned and rebound to fall through the hatches on to the pockets of the delivery lines placed below the said hatches.

* * * * *